May 18, 1937. T. BROWN 2,080,692
TRACTOR
Filed June 24, 1933 2 Sheets-Sheet 1
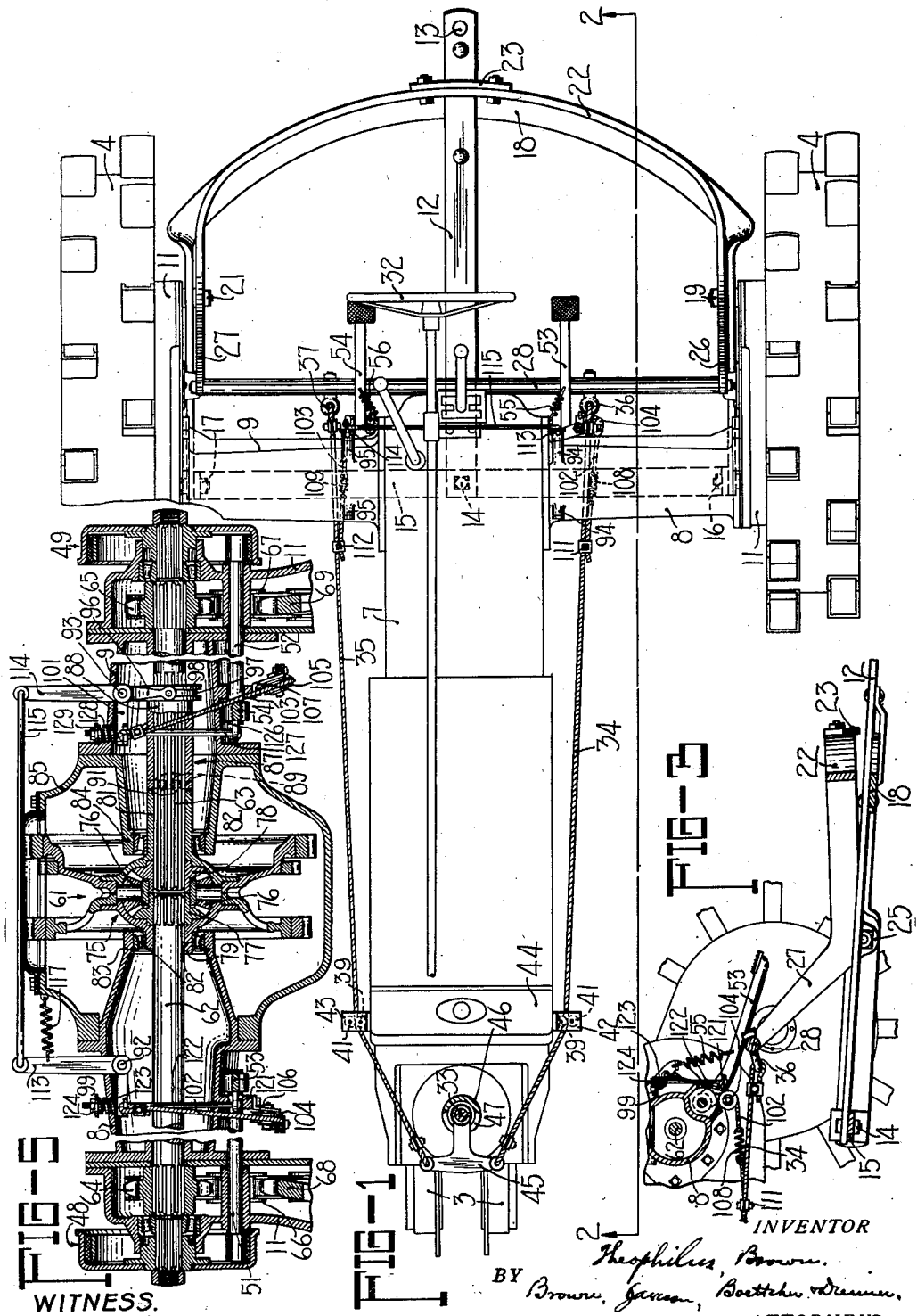
INVENTOR
Theophilus Brown.
BY Brown, Jackson, Boettcher & Dienner
ATTORNEYS.
WITNESS.
Edward Melin May 18, 1937.  T. BROWN  2,080,692
TRACTOR
Filed June 24, 1933  2 Sheets-Sheet 2
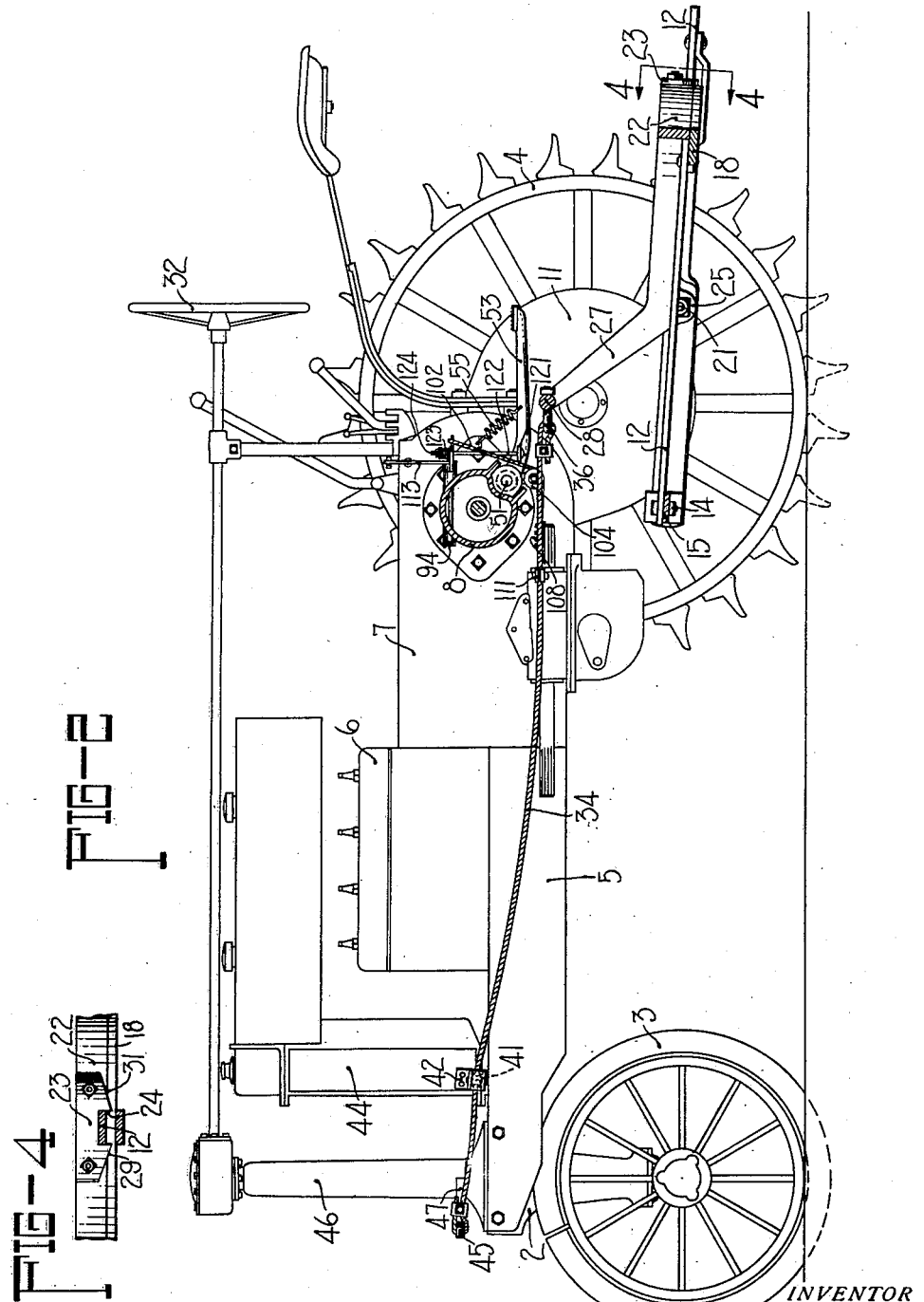
INVENTOR
Theophilus Brown,
BY Brown, Jackson, Boettcher & Dienner.
ATTORNEYS.
WITNESS.
Edward Melin.

Patented May 18, 1937

2,080,692

UNITED STATES PATENT OFFICE 2,080,692

TRACTOR

Theophilus Brown, Moline, Ill., assignor to Deere & Company, Moline, Ill., a corporation of Illinois Application June 24, 1933, Serial No. 677,411

14 Claims. (Cl. 180—18)

The present invention relates to tractors, and more particularly to tractors of the type commonly employed on farms for drawing trailing implements of various kinds such as plows, harrows, etc. Such farm tractors are usually provided with a generally longitudinally extending draw bar pivotally connected at its forward end to the tractor at a point in advance of the axis of the drive wheels of the tractor, the trailing implement being pivotally connected to the rear end of the draw bar at a point considerably rearward of the axis of the drive wheels of the tractor. In such structures, in order to prevent the implement from swinging laterally excessively responsive to slight variations in the load on one side of the implement relative to the load on the other side thereof, and particularly in the case where the trailing implement is a plow, it is desirable and has been customary to lock or otherwise secure the draw bar against swinging movement laterally about its pivot connection with the tractor. This locking of the draw bar establishes the point of pivotal connection between the implement and the tractor at the rear end of the draw bar at a point considerably rearward of the axis of the drive wheels of the tractor. It has been found, however, with the pivotal connection between the trailing implement and the tractor at this point, that the load of the implement offers appreciable resistance to the turning of the tractor, particularly when making a sharp turn, which is objectionable as it places excessive strain on the tractor. While it is desirable, therefore, to hold the draw bar against lateral swinging under certain operating conditions, it is also desirable to permit the draw bar to swing when turning the tractor because, with the relative turning between the implement and the tractor taking place about the point of pivotal connection of the front end of the draw bar with the implement, the load of the implement offers very little or no resistance at all to the turning of the tractor.

With the above in view, the principal object of the present invention is to provide means for locking the draw bar which may be unlocked when the tractor is to be turned to thereby permit the tractor to turn relative to the implement about the point of connection of the front end of the draw bar with the tractor.

Another object of the invention is to provide unlocking means which is responsive to the actuation of the steering wheel of the tractor, whereby the draw bar will be unlocked automatically when the operator actuates the steering wheel to make a turn.

As it has been found that it is desirable to unlock the draw bar only when making a sharp turn and not when the tractor is merely steered to cause it to swerve to one side or the other, as to avoid an obstruction or the like, a further object of the present invention is to so arrange the means interconnecting the steering wheel with the draw bar locking means that the draw bar will be unlocked only after the front steering wheels have been angled a predetermined amount relative to the tractor.

Tractors of the type above described are ordinarily provided with differential brakes, one for each of the drive wheels, one or the other of said brakes being actuated in making a sharp turn. As is well understood by those skilled in the art, in tractors of this type, actuating one or the other of said brakes will lock its associated traction wheel against movement whereby the tractor is caused to turn about the point of contact of that wheel on the ground. A still further object of the present invention, therefore, is to provide means for unlocking the draw bar which is responsive to the actuation of either of the differential brakes.

It sometimes happens, however, that the operator will make use of the differential brake mechanism when making a relatively quick swerve or even an ordinary turn in following a certain line of travel, thereby causing one wheel to retard somewhat without actually locking it against rotation, which is especially true when operating over slippery ground on which the front steering wheels do not have good traction. A still further object of the present invention is, therefore, to provide interconnecting means between the differential brake mechanism and the draw bar unlocking means so constructed and arranged that the unlocking means is responsive only to the operation of the differential brakes beyond a certain predetermined position, namely, that position to which said brakes must be operated to actually lock one or the other of the wheels.

Farm tractors now in general use, so far as I am aware, are all provided with conventional differential mechanism of the type wherein when making a turn the wheel on the outer side of the turn will rotate faster than the wheel on the inner side of the turn. It has been found, however, that in the use of tractors for farming purposes this type of differential is objectionable for the reason that if one of the drive wheels should lose traction and commence to spin the tractor is likely to be stalled since all of the power is diverted by the differential to the spinning wheel.

With this objection in view, it is a still further object of the present invention to provide a differential mechanism which is normally locked so that both wheels will be caused to always rotate at the same speed when traveling in a comparatively straight path, regardless of the difference in traction of the two wheels, but which differential mechanism can be unlocked when the tractor is to be turned.

A still further object of the invention is to provide means for automatically unlocking the differential mechanism responsive to the steering of the tractor,—that is to say, the steering of the tractor by the operation of the steering wheel or the actuation of either differential brake mechanism.

Further objects and advantageous features will be apparent from the following description of the preferred embodiment of the invention taken in connection with the accompanying drawings, in which:—

Figure 1 is a top plan view of a tractor equipped with my improvements;

Figure 2 is a longitudinal vertical sectional view taken on the plane of the line 2—2 of Figure 1 and illustrating the draw bar locking mechanism in operative position to lock the draw bar against lateral movement.

Figure 3 is a fragmentary longitudinal vertical sectional view of certain of the parts shown in Figure 2, illustrating the draw bar locking mechanism in inoperative position to permit the draw bar to swing laterally;

Figure 4 is a fragmentary transverse vertical sectional view taken on the plane of the line 4—4 of Figure 2, illustrating in elevation the latch of the draw bar locking device in operative position; and Figure 5 is a transverse vertical sectional view partly broken away through the differential and brake mechanisms, with certain parts being shown in elevation.

Referring to the drawings, the tractor illustrated is, generally, one of ordinary commercial form, the front end of the frame being supported on a steering truck 2 provided with two wheels 3 positioned relatively close together, the rear end of the frame being supported on traction wheels 4. The frame of the tractor includes the side frame members or bars 5 which support the engine 6 and are connected with the longitudinally extending crank case 7. Enclosed within the crank case is the usual speed selecting gear mechanism and the differential mechanism through which power is transmitted to the rear wheels 4 by transverse jack shafts extending from said differential mechanism outwardly from the sides of the crank case 7 through extension housings 8 and 9. The extension housings 8 and 9 are each provided with a chain housing 11 which extends rearwardly and downwardly from the outer end thereof. These chain housings support the stub axles on which the traction wheels 4 are mounted, as is usual in tractors of this general type.

Coming now to a description of the first of my improvements, the draw bar of the tractor is indicated by the numeral 12, and the forward end of the draft member of the plow or other trailing implement or vehicle (not shown) is adapted to be connected to the draw bar by means of the usual king pin (not shown) inserted in the hole 13 provided therefor in the rear end of the draw bar, as shown in Figure 1. The forward end of the draw bar 12 is pivotally connected by a pivot bolt or pin 14 to a cross bar or member 15 having its opposite ends bolted to the inner sides of the chain housings 11 by means of bolts 16 and 17, see Figure 1. The draw bar 12 is slidably supported for lateral swinging movement about the pivot bolt 14 on a U-shaped supporting member 18, the ends of which are connected to the chain housings 11 of the tractor by means of the bolts 16 and 17 described above and bolts 19 and 21, as shown in Figure 1.

To normally hold the draw bar 12 against swinging laterally on its pivot 14 I provide suitable mechanism comprising a U-shaped locking member 22 to the central portion of which is fixed in any suitable manner a latch plate 23 provided with a notch 24 at its lower side in which the draw bar 12 is normally engaged, as best shown in Figures 2 and 4. The arms of the U-shaped locking member 22 are pivotally supported on the bolts 19 and 21 which secure the supporting member 18 to the chain housings 11 as above described, for this purpose each of said arms being provided with a downwardly extending integral ear 25, as shown in Figures 2 and 3. The arms of the locking member 22 are provided forward of the ears 25 with upwardly and forwardly extending integral portions 26 and 27, respectively, the outer ends of said portions being connected together by a cross bar 28.

As will be readily understood, swinging of the locking member 22 about its pivotal supports 19 and 21 in a counterclockwise direction as viewed in Figures 2 and 3 will raise the latch plate 23 carried by said member out of engagement with the draw bar 12, whereupon the draw bar will be free to swing laterally about its pivot 14. As best shown in Figure 4, the latch plate 23 on each side of the slot 24 is beveled upwardly and outwardly as shown at 29, 31, and as a result of which when the draw bar is swung back toward its normal longitudinally extending position it will strike against one or the other of the beveled surfaces 29 or 31 and will rotate the member 22 upward sufficiently to permit the draw bar 12 to reengage the notch 24.

The front wheels 3 are angled by a hand steering wheel 32 provided adjacent the operator's position on the tractor. For this purpose the steering wheel 32 is connected in any conventional manner with the vertical spindle 33 of the front steering truck 2, and the locking member 22 is rocked to release the draw bar 12 from the notch 24 of the latch plate 23 responsive to the actuation of said hand steering wheel 32 through suitable means connecting the vertical spindle 33 of the steering means with the locking member 22.

This connecting means includes a pair of cables 34 and 35 respectively connected at their rear ends in any suitable manner to eyes 36 and 37 carried by the cross bar 28, one of said cables extending along each side of the tractor as shown. Each of the cables 34 and 35 extend between pairs of rollers 39, 41 which are supported in brackets 42 and 43, respectively, suitably secured to and extending laterally from the opposite sides of the radiator 44 of the tractor. The forward ends of the cables 34 and 35 are connected respectively to the two arms of a T-shaped arm or beam member 45 having its central portion fixed in any suitable manner to the steering spindle 33 of the steering mechanism so as to turn therewith. As shown, the spindle 33 is enclosed by a housing 46 as is usual in tractor constructions, said housing being provided with a slot 47 through which the stem portion of the yoke member 45 extends (see Figures 1 and 2). As shown in Figure 2, the cables 34 and 35 are both provided with sufficient slack so that the spindle 33 may be rotated to a certain predetermined amount in either direction to angle the steering wheels before either cable will become taut. As will be readily understood, after one cable becomes taut upon rotation of the spindle in one direction, further rotation of the spindle in the same direction will pull that cable forward, thus moving the cross bar 28 forward and swinging the locking member 22 in a counterclockwise direction about its pivot connections 19 and 21 to release the latch plate 23 from the draw bar 12 to permit the draw bar to swing freely laterally about its pivot axis 14.

Coming now to the means for unlocking the draw bar upon operation of either differential brake mechanism, as best shown in Figure 5 the differential brakes associated with the drive wheels 4 are indicated, generally, by the numerals 48 and 49, respectively, said brakes being respectively controlled by means of transversely extending rock shafts 51 and 52 operatively connected with said brakes in any suitable manner. As these differential brakes are of conventional design, a detailed description thereof is deemed unnecessary herein. Fixed to the inner ends of the rock shafts 51 and 52 are foot pedals or levers 53 and 54, respectively, disposed adjacent the operator's position on the tractor, one at each side as shown in Figure 1. The foot pedals 53 and 54 are held in normal inoperative position by coiled tension springs 55 and 56, respectively, connected to said foot pedals and to the respective extension housings 8 and 9.

As will be readily understood, by actuating one or the other of the foot pedals the brake associated therewith may be set to lock the drive wheel at that side of the tractor to accomplish the turning of the tractor by the rotation of the opposite wheel. The cross bar 28 which connects the forward ends of the extension portions 26 and 27 of the locking member 22 is disposed below the foot pedals 53 and 54 and spaced a short distance therefrom when the locking member is in its normal or operative position for locking the draw bar against lateral movement, as shown in Figure 2. As a result of this arrangement, the actuation of either foot pedal 53 or 54 beyond the position where it contacts with the cross bar 28 will cause the cross bar to be moved downwardly, thereby rocking the locking member 22 on its pivots 19 and 21 in a counterclockwise direction as viewed in Figure 2 and releasing the latch plate 23 from the draw bar 12, whereupon the draw bar will be free to swing laterally on its pivot 14. By spacing the foot pedals 53 and 54 from the cross bar 28 the proper distance, i. e., the distance it is necessary to depress the pedals to effect a locking of the differential brakes, the pedals will not be effective to unlock the draw bar until they are depressed sufficiently to lock the differential brakes. The spacing may, of course, be varied to secure the desired correlation. For example, the spacing of the pedals and bar may be decreased if it should be desired to release the draw bar 12 sooner.

It will thus be seen that by providing the means for unlocking the draw bar from its normal longitudinally extending position so as to permit it to swing laterally about the pivot connection of its forward end with the tractor upon the turning of the tractor, by either the angling of the front steering wheels or the actuation of one or the other of the brake pedals, the tendency of the draw bar to resist turning of the tractor is practically eliminated.

As mentioned above, it is desirable in implements of this sort to provide a differential lock for straight or nearly straight travel, but it is equally desirable that the differential mechanism shall be capable of being unlocked, as when turning or the like, for the reason that if the differential were to remain locked when the tractor is turned, such locked differential would resist turning of the tractor to such an extent as to impose undue stresses on the steering wheels and steering linkage. Referring now to Figure 5, the rear traction wheels 4 are driven by power from the tractor motor delivered through a differential mechanism, indicated as an entirety by the numeral 61, mounted on the inner ends of the transverse drive or jack shafts 62 and 63. Mounted on the outer ends of the drive shafts 62 and 63, respectively, are sprockets 64 and 65 respectively connected by means of driving chains 66 and 67 with sprockets 68 and 69 fixed to the axles of the respective traction wheels 4 and disposed within the drive housings 11. The differential brakes 48 and 49 previously described are mounted on the outer ends of the drive shafts 62 and 63 on the outer side of the sprockets 64 and 65, as shown in Figure 5.

The differential mechanism comprises the usual driving element 75 in which is journaled four beveled pinions 76, only two of which are illustrated. The pinions 76, as is usual in differential mechanisms of this type, mesh with a bevel gear 77 fixed to the inner end of the drive shaft 62 and also with a bevel gear 78 fixed to the inner end of the drive shaft 63. The driving element 75 is provided with integral sleeve portions or members 79 and 81 laterally outwardly of the bevel gears 77 and 78 in which the inner ends of the drive shafts 62 and 63 are respectively journaled, and said sleeve members are in turn journaled by means of tapered roller bearings 82 or the equivalent in the inner ends of sleeves 83 and 84, respectively. As shown, the sleeve 83 is formed as an integral part of the extension housing 8, while the sleeve 84 is formed as an integral part of a housing 85 which encloses the differential mechanism as shown and is secured in any suitable manner to the other extension housing 9, to facilitate manufacture and assembly of these and associated parts.

In the normal operation of the differential 61 above described, the drive from the driving member 75 to the drive shafts 62 and 63 is transmitted through the differential pinions, the power being divided between the shafts 62 and 63 according to load and traction conditions. However, if one of the wheels should slip or spin, the power will all be diverted to that wheel and none will be delivered to the wheel which has traction. As mentioned above, this is objectionable. In the present construction, therefore, mechanism has been provided for normally holding the differential locked against such operation when the tractor is traveling in a comparatively straight course, but which will be automatically unlocked when the tractor is steered to make a turn. This means is in the form of a clutch 87 comprising a sleeve 88 splined, as shown, or otherwise secured to the inner end of the drive shaft 63. The sleeve 88 is provided with a series of rectangular notches 89 on its inner end which are adapted to engage with similarly shaped notches 91 provided on the outer end of the sleeve 81 of the driving element 75. Thus, when the notches 89 and 91 are in engagement, the driving member 75 is locked against rotation relative to the shaft 63, with the result that through the intermeshing of the bevel gears 77 and 78 and the bevel pinions 76, the drive shaft 62 is also locked against relative rotation with respect to the driving member 75. It will thus be seen that the driving shafts 62 and 63 now operate as would a single shaft having a single driving gear connected thereto.

It is to be noted, however, that in the present construction the sleeve 88 of the clutch mechanism 87 may be slid outwardly along the shaft 63 to disengage the notches 89 from the notches 91, and when the notches are so disengaged the differential 61 may operate in the usual manner of differentials of this type. As it is desirable that the differential operate in its normal manner when the tractor is making a turn, whereby one of the drive wheels may rotate faster than the other, in the present construction, interconnecting mechanism has been provided between the two steering mechanisms above described and the clutch sleeve 88 whereby when the hand steering wheel 32 is operated to angle the steering truck in either direction beyond a certain predetermined point, or when the brake pedals 53 or 54 are operated to lock one or the other of the differential brakes to cause turning of the tractor, the sleeve 88 will be moved to its alternative or outermost position to unlock the differential 61 from the shaft 63 to permit the differential to function as such.

This interconnecting mechanism above referred to includes a pair of longitudinally disposed rock shafts 92 and 93 journaled in pairs of bosses 94 and 95, respectively, formed on the extension housings 8 and 9, respectively, and extending transversely thereof as shown in Figure 1. The rock shaft 93 has a forked member 96 fixed to the central portion thereof and extending downwardly therefrom, as shown in Figure 5, the ends of the arms of said forked member being provided with inwardly directed lugs which engage in a circumferential recess 97 in a collar 98 formed on or carried by the outer end of the slidable clutch sleeve 88. Fixed to the rear end of the other rock shaft 92 outside the extension housing 8 is a laterally extending arm 99, and fixed to the rear end of the rock shaft 93 is a similar arm 101. Cables 102 and 103 are connected at one end, respectively, in any suitable manner to the outer ends of the arms 99 and 101, said cables tracking over rollers 104 and 105, respectively, supported in brackets 106 and 107 suitably fixed to and supported by the respective extension housings 8 and 9. The opposite ends of the cables 102 and 103 are respectively connected by means of springs 108 and 109 and short cables to the cables 34 and 35 at points 111 and 112, as shown in Figure 1. The rock shafts 92 and 93 are also provided, respectively, with vertically extending arms 113 and 114 fixed to the rear ends thereof, said arms being connected together by means of a transversely extending link 115 pivotally connected at its opposite ends to the upper ends of the arms 113 and 114.

It will be seen from the foregoing that as a result of this interconnection between the clutch 87, the two rock shafts 92 and 93 and the cables 34 and 35, whenever the hand steering wheel 32 is rotated sufficiently to pull either of the cables 34 and 35 forwardly, the rock shaft 93 will be rotated in a counterclockwise direction as viewed in Figure 5, swinging the fork 96 laterally outwardly and, thereby moving the clutch sleeve 88 outwardly or to the right as shown in said figure and causing the notches 89 and 91 to disengage, thereby permitting the differential mechanism 61 to operate normally whereby one drive wheel may rotate faster than the other.

The outer ends of the splines on the shaft 63 form a stop for limiting the outward movement of the clutch sleeve 88 when it is moved to unlocking position upon movement of either of the cables 34 or 35 in the operation of steering the tractor. Of course, other means such as a collar or the like may be employed, if desired. After the sleeve 88 has been moved to its limit position outwardly, further movement of either of the cables 34 or 35 in the steering of the tractor merely stretching the spring 108 or 109, as the case may be, which connect the cables 102 and 103 with the cables 34 and 35, respectively, as above described.

When the tractor is traveling in a comparatively straight course the several parts of the differential locking mechanism are maintained in normal locked position with the notches 89 and 91 in interlocking engagement by a tension spring 117 connected at one end with the arm 113 and at its other end with the housing 85. As will be readily understood, the spring 117 acts normally to hold the differential locked by preventing movement of the arm 113 and the link 115 to the left as seen in Figure 5, thereby preventing movement of the arm 114 to the left, and holding the rock shaft 93 against turning in a counterclockwise direction to disengage the notches 89 and 91.

It will be readily understood, however, that when the hand steering wheel 32 is turned to steer the tractor, thus causing a tensioning and forward pull on either cable 34 or 35, as the case may be, through the interconnection of said cable with its associated rock shaft 92 or 93, said rock shaft will be rotated to unlock the differential locking mechanism, against the tension of the spring 117.

As above described the tractor of the present invention is also provided with differential brake mechanism by which the tractor may also be steered in making a turn, and, therefore, means has also been provided whereby when the tractor is steered through the instrumentality of the differential brake mechanism by the operation of either of the foot pedals 53 or 54, the differential mechanism 61 will also be unlocked to permit the drive wheel on the outer side of the turn to rotate faster than the drive wheel on the inner side of the turn. For this purpose, as shown in Figure 5, the foot pedal 53 is provided with a laterally extending lug 121 fixed thereto or formed integral therewith and supporting a rod 122 which extends up through a perforation in the arm 99 fixed to the rock shaft 92 of the differential locking mechanism. A coiled spring 123 embraces the rod 122 and is disposed between the upper face of the arm 99 and a nut 124 threaded on the upper end of the rod 122. The foot pedal 54 is also provided with a similar lug 126 formed integral therewith and supporting a rod 127 which in turn extends through a perforation in the arm 101 fixed to the rock shaft 93 of the differential locking mechanism. A coiled spring 128 embraces the rod 127 and is disposed between the upper face of the arm 101 and a nut 129 threaded on the upper end of the rod 127.

As will be readily apparent, the result of this interconnection between the foot pedals 53 and 54 and the arms 99 and 101, when either foot pedal is operated to set its associated brake, as when making a turn, the sleeve 88 will be moved outwardly on the shaft 63 to disengage the notches 89 and 91, thereby unlocking the differential. After the sleeve 88 has been moved to its limit position to the right as above described, further movement of either pedal 53 or 54 in the same direction merely compresses the spring 123 or the spring 128, as the case may be.

As will be readily appreciated from the foregoing description of my invention, the locked draw bar and also the locked differential each acts separately to resist turning of the tractor, so that when the tractor is steered to make a turn, either by angling the front steering wheels or by actuating either of the differential brakes, the draw bar and the differential are both automatically unlocked, thus rendering them ineffective to resist turning of the tractor.

I claim:—

1. The combination with a tractor having a swinging draw bar and steering means operable to steer the tractor, of locking means normally holding said draw bar against swinging, and means responsive to the operation of said steering means after it has been moved through a predetermined extent for moving said locking means to inoperative position to release said draw bar for free swinging movement.

2. The combination with a tractor having a swinging draw bar and dirigible steering means operable to steer the tractor, said steering means being operable through a definite range in either direction from a neutral position to steer the tractor either to the right or to the left to different degrees of turning angle, of a locking member normally holding said draw bar against swinging, and means responsive to the operation of said steering means beyond a certain position on either side of said neutral position for moving said locking member to inoperative position to release said draw bar for free swinging movement.

3. A tractor having a shiftable draw bar, steering means operable to steer the tractor and including differential brakes, each of such brakes having a part movable when the brakes are applied and released, and means responsive to the movement of either one of said parts for locking and unlocking said draw bar.

4. The combination with a tractor having a swinging draw bar, and steering means operable to steer the tractor, of locking means for normally holding said draw bar against swinging, comprising a U-shaped member pivotally connected with the tractor to swing vertically about a transverse axis and a latch plate carried by said member for engaging said draw bar, and means responsive to the operation of said steering means for swinging said member vertically to release said latch plate from said draw bar to release said draw bar for free swinging movement.

5. The combination with a tractor having a swinging draw bar, and steering means operable to steer the tractor, of locking means for normally holding said draw bar against swinging, comprising a member pivotally connected with the tractor to swing vertically and a latch plate carried by said member and having a notch for engaging said draw bar, and means responsive to the operation of said steering means for swinging said member vertically to release said latch plate from said draw bar to release said draw bar for free swinging movement, said latch plate being beveled on opposite sides of said notch to facilitate reengagement of said latch plate with said draw bar when said locking means returns to normal operative position.

6. The combination with a tractor having a swinging draw bar, and a dirigible supporting wheel means including a vertical spindle journaled on the tractor and rotatable to steer said wheel means, of a locking member pivotally connected with the tractor to swing vertically about a transverse axis and engageable with said draw bar to normally hold said draw bar against swinging, a T-shaped member having its stem portion secured to said spindle to turn therewith and its arms extending laterally at opposite sides thereof, and cables extending along opposite sides of the tractor and connecting the arms of said T-shaped member with said locking member whereby the latter member is swung vertically on its axis in response to the operation of said steering means to release said draw bar for free swinging movement.

7. The combination with a tractor having a swinging draw bar, a pair of spaced drive wheels to which power is applied through a differential, and a brake and brake actuating means for each wheel to lock the same against rotation to effect sharp turning of the tractor, of a locking member carried by the tractor and normally engaging said draw bar to lock the same against swinging, means to release said draw bar for free swinging movement to provide for turning the tractor sharply, and connections between said releasing means and said brake and brake actuating means and including means serving as lost motion mechanism cooperating with said locking member for moving the latter to inoperative position only after either brake actuating means has been operated to a certain extent to effect a certain amount of steering of the tractor with said draw bar locked against swinging.

8. The combination with a tractor having a swinging draw bar, dirigible supporting wheel means movable about a vertical axis to steer the tractor, a pair of spaced drive wheels, and means for causing an unequal distribution of power to said drive wheels to facilitate steering, of a locking member for normally holding said draw bar against swinging, and means responsive to the movement of said dirigible wheel means to a certain predetermined position and to the actuation of said second named means for moving said locking member to release said draw bar for free swinging movement.

9. The combination with a tractor having a longitudinally extending draw bar pivotally connected to the tractor at its forward end for lateral swinging movement, a pair of spaced drive wheels, a brake for each wheel, a lever for each brake for operating the same, said levers being movable in vertical planes, of a locking member pivotally connected with the tractor and engageable with said draw bar to normally lock the same against swinging, and an arm on said member extending into the path of said levers, whereby when either of said levers is actuated said arm will be engaged thereby and moved to swing said locking member out of engagement with said draw bar to release said draw bar for free swinging movement.

10. The combination with a tractor having a longitudinally extending draw bar pivotally connected to the tractor at its forward end for lateral swinging movement, a pair of spaced drive wheels, a brake for each wheel, a lever for each brake for operating the same, said levers being movable in vertical planes, of a locking member pivotally connected with the tractor to swing vertically about a transverse axis and engaging said draw bar to normally lock the same against swinging, and an arm on said member extending into the path of said levers, whereby when either of said levers is actuated said arm will be engaged thereby and moved to swing said locking member out of engagement with said draw bar to release said draw bar for free swinging movement, said arm being spaced from said levers a predetermined distance whereby said levers must be moved sufficiently to substantially lock their respective brakes before becoming operative to actuate said arm.

11. The combination with a tractor having a swinging draw bar, a pair of spaced drive wheels, and means for causing an unequal distribution of power to said drive wheels to facilitate steering, of a locking member movable into engagement with the draw bar for normally holding said draw bar against swinging, and means responsive to the actuation of said first named means and operative after a predetermined extent of movement thereof for moving said locking member out of engagement with the draw bar to release said draw bar for free swinging movement, whereby the steering of the tractor may be facilitated to a certain extent before said locking member is moved out of engagement with the draw bar to release said draw bar for swinging movement.

12. The combination with a tractor having a longitudinally extending draw bar pivotally connected to the tractor at its forward end for lateral swinging movement, and a dirigible supporting wheel including a vertical spindle journaled on the tractor and rotatable to steer said wheel, of a locking member pivotally connected with the tractor to swing vertically about a transverse axis and engaging said draw bar to normally lock the same against swinging, an arm on said member, a yoke member on said spindle, the ends of said yoke member extending laterally in opposite directions, and lost motion connections between the ends of said yoke member and said arm whereby when said spindle is moved beyond certain positions on opposite sides of its mid-portion, said locking member is swung out of engagement with said draw bar to release said draw bar for free swinging movement.

13. The combination with a tractor having a dirigible supporting wheel including a vertical spindle journaled on the tractor and rotatable to steer the tractor, of a yoke member on said spindle, the ends of said yoke member extending laterally in opposite directions, a draw bar swingably mounted on the tractor, means for normally locking said draw bar against swinging movement, and lost motion connections between the ends of said yoke member and said draw bar locking means whereby, when said wheel spindle is moved beyond certain positions on opposite sides of its mid position, said locking means is rendered ineffective.

14. The combination with a tractor having a pair of spaced drive wheels, a brake for each wheel, a lever for each brake for operating the same, a draw bar swingably mounted on the tractor, means for normally locking said draw bar against swinging movement, and a lost motion connection between each of said levers and said draw bar locking means, whereby when either of said levers is actuated said draw bar locking means will be rendered ineffective, said lost motion connections providing for operation of said brakes to a certain predetermined extent before said draw bar locking means is rendered ineffective.

THEOPHILUS BROWN.